INVENTOR.
Lawrence J. Kyle
BY

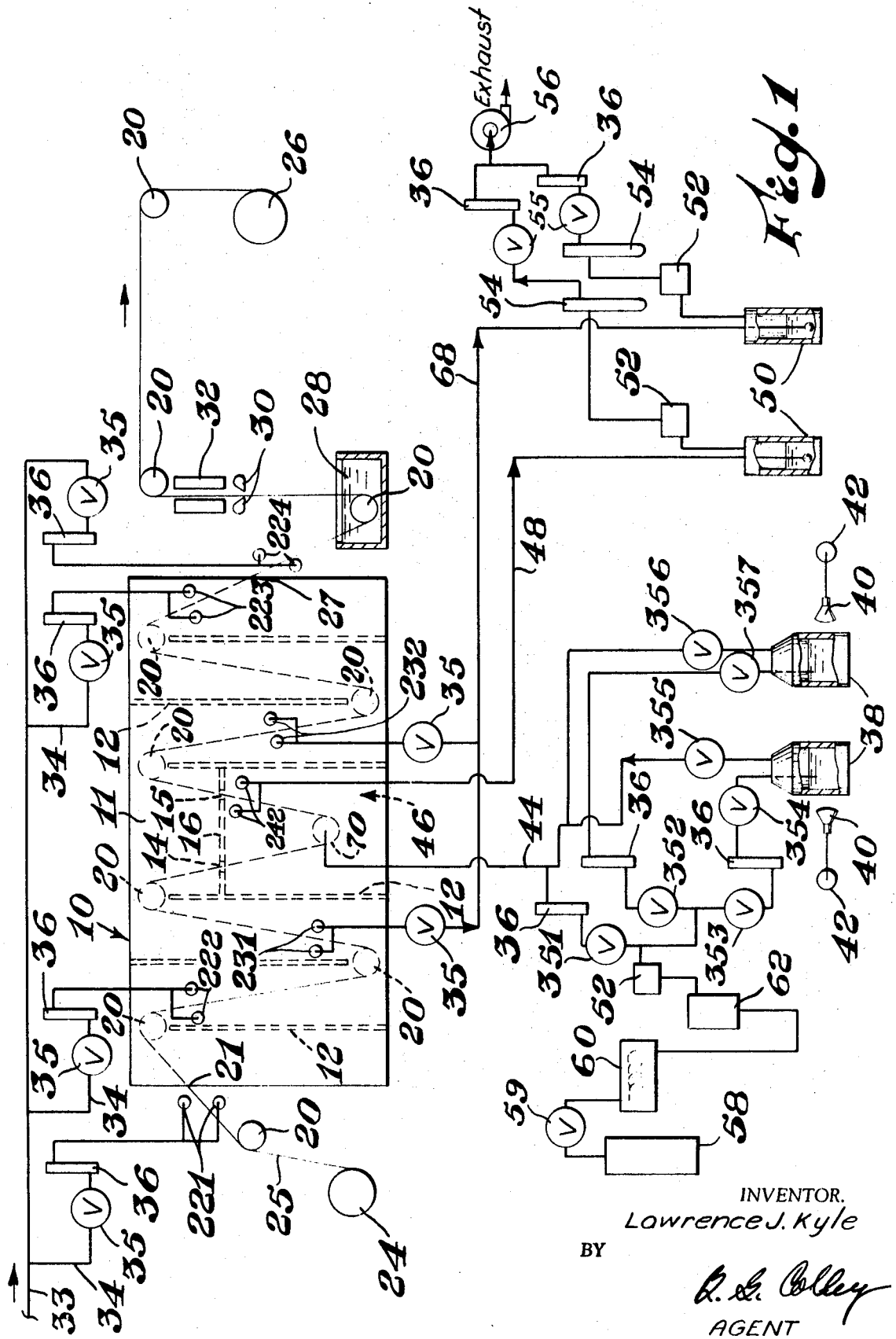

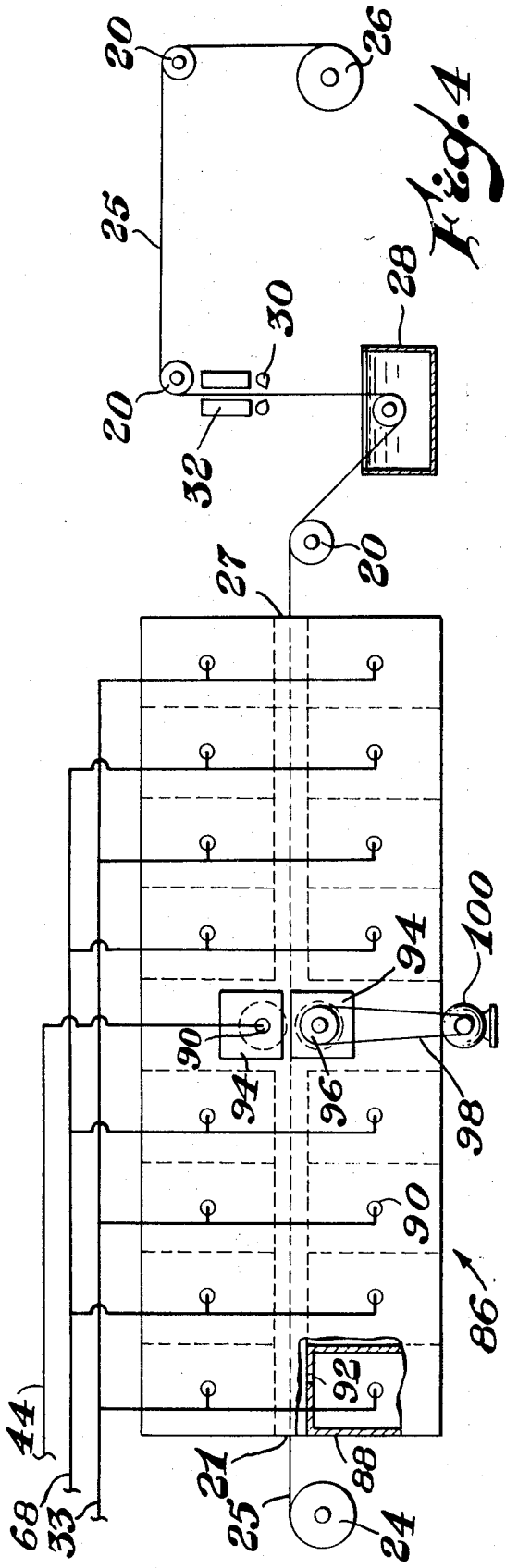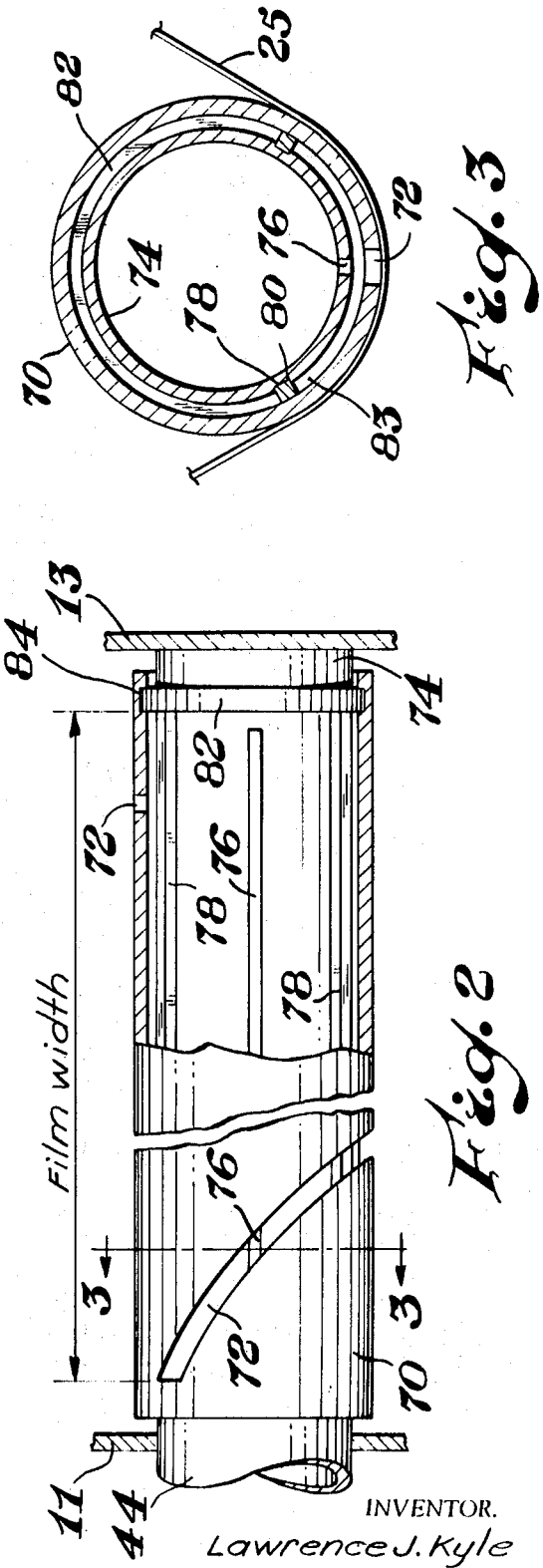

B. S. Colley
AGENT

INVENTOR.
Lawrence J. Kyle
BY
AGENT

United States Patent Office 3,605,185
Patented Sept. 20, 1971

3,605,185
APPARATUS FOR PRODUCING A LATENT DECORATED EFFECT ON PLASTIC FILMS
Lawrence J. Kyle, Midland, Mich., assignor to The Dow Chemical Company, Midland, Mich.
Filed Dec. 4, 1969, Ser. No. 882,134
Int. Cl. B29d 7/20, 7/22, 7/26
U.S. Cl. 18—10
10 Claims

ABSTRACT OF THE DISCLOSURE

An apparatus for the rapid vapor phase sulfonation of plastic films wherein the film is treated with a jet of a gas containing sulfur trioxide to achieve a latent decorated effect. Subsequent dyeing of the treated film with water soluble dyes produces an attractively decorated, distinctive film useful as a wrapping material for edible and non-edible consumer goods.

BACKGROUND OF THE INVENTION

This invention relates to an apparatus for the selective vapor phase sulfonation of plastic films.

It is known from U.S. Pat. 2,400,720 that aromatic plastic films can be sulfonated in an atmosphere of sulfur trioxide ($SO_3$) and dyed. However, in the manufacture of large quantities of sulfonated film by this process, it was found that an intolerable amount of $SO_3$ escaped from the apparatus, that moisture in the ambient air or on the plastic film inhibited the sulfonation reaction, and that the reaction required a relatively long residence time in the $SO_3$ atmosphere and was too slow for rapid production.

SUMMARY OF THE INVENTION

It now has been discovered that plastic or polymer films can be rapidly given a latent decorated effect by an apparatus in which the polymer film is contacted with a jet of a dry gas containing $SO_3$ in a substantially dry atmosphere and subsequently dyed.

This invention is useful in the large volume production of decorated plastic films where high speeds, e.g. up to 1000 feet per minute, are desired with uniform sulfonation and dyeing. The appropriately decorated plastic film so produced can be used for the holiday wrapping of non-edibles or the wrapping or sacking of comestibles such as vegetables and fruits.

In accordance with this invention an apparatus is disclosed in which plastic films are treated to achieve a latent decorated effect by moving the plastic film through a substantially dry gaseous sulfonation zone containing a jet rotating device at a predetermined rate of speed and simultaneously contacting a least one side of said film in said sulfonation zone with at least one jet of a dry gas containing gaseous sulfur trioxide and having a predetermined size at a predetermined distance from said zone. If desired, the film can be given more than one design by contacting it with a plurality of jets. It is also sometimes desirable to contact both sides of the film with either a single jet, a plurality of jets or a combination of both.

Still further decorative effects are obtained if the plastic film to be decorated has one side previously surface sulfonated and the opposite side is decorated by a single or a plurality of jets. This latent decorated film then can be dyed different colors on one side and contrasting colors on the other to produce interesting effects if the film is normally transparent. For example, by the proper choice of dyes it is possible to have two different colors (blue and yellow) by reflected light and a third color (green) by transmitted light through the overlapping dyed surfaces.

DETAILED DESCRIPTION OF THE INVENTION

According to the present invention, polymer films made from plastics such as polyolefins, vinyl aromatic polymers, polyesters, etc. as well as blends thereof, and laminates thereof, are given a latent decorative effect by contacting the film with a jet of a dry gas containing $SO_3$ in a substantially dry atmosphere. It is essential to this invention that the gaseous atmosphere contained in, associated with, or in contact with the sulfonation treatment zone of this invention be substantially dry. Likewise, it is essential that the polymer film to be treated is either substantially dry or rendered dry by a drying step prior to the sulfonation step.

The drying step is to remove surface moisture from the polymer film since the presence of moisture causes the formation of sulfuric acid when $SO_3$ contacts the moisture. The presence of sulfuric acid droplets on the polymer web interferes with the uniform sulfonating of the polymeric surface or surface layers. This drying step, when used, can be accomplished by a drying oven, a blast of dry inert gas, or by moving the polymer film through a chamber of dry inert gas which is maintained in a dry condition by suitable recirculating and drying means.

For the purpose of this invention, the term dry gas means one having a dew point below 10° C. It is preferred to use a gas having a dew point below —40° C. The use of a blast of a dry inert gas is preferred since this positive force of gas molecules has a scrubbing or scouring action on the film surface which substantially removes all the water molecules. For the purposes of this invention a blast or jet of gas is intended to mean a sheet, or jet of gas molecules having a narrow width relative to the width of the film, flowing at a rate greater than about 10 feet per second and preferably in the range from about 100 to about 400 feet per second and can be as high as 1000 feet per second.

It is understood that the drying step can be dispensed with when the ambient air of the laboratory or plant is already sufficiently dry as in periods of low humidity during wintertime or in naturally dry, desert-like atmospheres.

The essential element in this apparatus is the jet rotating device which contacts the dry polymer web with a jet of an inert gas containing gaseous $SO_3$. The advantage of this apparatus is that it can run continuously and at high speeds.

It is desirable in the apparatus of the present invention that after the sulfonation, the treated polymer films are contacted with a continuous blast or sheet of dry inert gas to remove excess $SO_3$. This removed $SO_3$ is then exhausted out of the surrounding area and can be disposed of by suitable means, e.g., neutralization with aqueous solutions of bases. Thus, contamination of the surrounding atmosphere does not take place.

The sulfonated polymer film can then be dyed with an aqueous solution of a dye. Thus, the film can be dipped into or sprayed with an aqueous solution of a commercial dye to bring out the latent decorated effect. Examples of commercially available water soluble dyes are Malachite Green, Methylene Blue, Bismarck Brown, Methyl Violet, and Astrazon Blue.

DESCRIPTION OF DRAWINGS

The present invention is further illustrated by the drawings wherein:

FIG. 1 is a schematic view showing one embodiment of the apparatus in which the polymer web 25 going through the sulfonation chamber 10 is treated with a sequence of dry gases provided by the associated equipment, given a dye bath and dried before rewinding.

FIG. 2 is a schematic view of the bottom side of internally powered roller 70.

FIG. 3 is a cross-sectional view of line 3—3 of FIG. 2 showing the position of the film 25 in relation to the roller 70.

FIG. 4 is a schematic view of an alternative apparatus using the same gases provided for FIG. 1 but using a plurality of aligned treatment boxes 88 together with externally powered rollers 102.

DETAILED DESCRIPTION OF DRAWINGS

Figure 5:
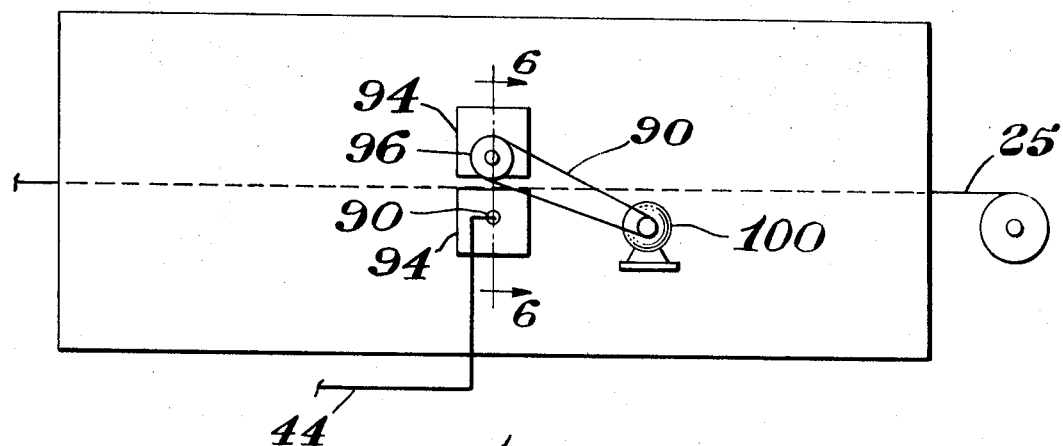
FIG. 5 is a rear view of FIG. 4 illustrating the external source of power for the upper powered roller.

FIG. 1 shows the apparatus useful in this invention in which an enclosed sulfonation chamber 10 having a front side wall 11, rear side wall 13 (shown in FIG. 2) is associated with a dye bath 28 together with various associated apparatus to supply gaseous $SO_3$ which will be described later.

In chamber 10 there are a series of vertical baffles 12 which substantially divide the chamber 10 into a series of compartments. The horizontal baffle 16 in chamber 10 together with vertical baffles 12 define the sulfonation zone 46. This baffle 16 has inlet and outlet slots 14 and 15 respectively for the passage of the polymer film.

The plastic film 25 is unwound from the feed roller 24 and fed into the inlet slot 21 of the sulfonation chamber 10 over an idler roller 20. Throughout the sulfonation chamber there are suitably mounted a series of other idler rollers 20 at the upper or lower ends of the vertical baffles 12 to effectively divide chamber 10 into various zones.

The incoming polymer web 25 is scrubbed dry by the first inert gas tubular scrubbers 221 located adjacent to and outside the chamber 10 and further dried by a second set of inert gas tubular scrubbers 222 located inside the chamber 10. Tubular scrubbers 221 also insure that no moist air enters the sulfonation chamber 10. These scrubbers are located as indicated in FIG. 1 and extend across the width of the sulfonation chamber with an axial slot (not shown) in them extending substantially the width of the chamber adjacent to and somewhat less than the width of the polymer film.

The excess inert gas introduced into chamber 10 and any $SO_3$ that inadvertently leaks out of the sulfonation zone 46 through slots 14 and 15 is exhausted by means of the first inert gas tubular exhaust 231. The second inert gas tubular exhaust 232 performs a similar function on the downstream side of the sulfonation zone 46. The sulfonation zone 46 is provided with a freely turning slotted or internally powered roller 70 which is driven by the film 25 passing under it and in frictional contact with it. The excess $SO_3$ gas is exhausted from this zone 46 by a pair of tubular exhausts 242.

In order to remove excess $SO_3$ gas clinging to the polymer film, a third pair of inert gas tubular scrubbers 223 are provided to scrub the polymer film with a blast of inert gas after treatment in the sulfonation zone 46.

The fourth pair of inert gas tubular scrubbers 224 located outside chamber 10 adjacent to the outlet slot 27 prevent the entrance of moist air from the ambient atmosphere. It is to be understood that the tubular scrubbers and exhausts 231, 232, 233 and 234 all have an axial slot in them similar to the slot in scrubbers 221 and 222.

The treated film is then dyed in a dye bath 28, blown free of water by air knives 30 and dried in an oven 32 before being wound up on take-up roller 26.

The aforementioned dry inert gas is supplied to the chamber 10 by a supply line 33 having a series of branch lines 34 equipped with control valves 35 and a flow rate meters 36. A suitable gas is dry nitrogen but dry air, dry carbon dioxide, and the like are also useful.

Dilute $SO_3$ gas is supplied to the chamber 10 through line 44 by vaporizing liquid $SO_3$ in tanks 38 which are heated to about 33° C. by infrared heaters 40. The latter are controlled by rheostats 42 and are powered by an electric power line (not shown). The $SO_3$ is normally diluted to about 2 percent by volume concentration in a dry inert gas such as carbon dioxide by bubbling the inert gas through the liquid $SO_3$ and controlling the dilution by means of a series of valves 351–357. However, it can be used at 15 percent concentration or higher if greater sulfonation speed is desired. The inert diluent gas, carbon dioxide, air, sulfur dioxide, nitrogen, and the like is supplied by a tank 58. After leaving the tank 58, the gas is lowered in pressure by the pressure regulator 59, warmed by heater 60, dehydrated in a drier 62, filtered in an aerosol filter 52, and bubbled into the molten $SO_3$ in tank 38 at a rate measured through the meters 36.

The exhaust gases from the sulfonation zone 46 are fed through line 48 into the 95 percent sulfuric acid adsorbing tank 50, filtered in an aerosol filter 52 and exhausted to the atmosphere through a pressure measuring device (manometer) 54 and meter 36 by means of a fan or air pump 56. The flow of exhaust gases is controlled by flow control valve 55.

The gases removed from tubular exhausts 231 and 232 by line 68 receive similar treatment.

The essential operation of the apparatus illustrated in FIG. 1 is as follows. The gas containing $SO_3$ enters the sulfonation zone 46 by way of supply line 44. The gas enters the fixed tube 74 and exits therefrom as a jet by means of the axial slot 76 (shown in FIGS. 2 and 3). The gas flows into and out of the space defined by the outer wall of the fixed tube 74, and inner wall of the slotted roller 70, the axial gaskets 78, and the partial circumferential gaskets 82. The gas is continuously bled out of this confined space by means of outlet gap 83 (FIG. 3) in one or both of the circumferential gaskets 82 so that a constant supply of fresh reactive gas is supplied. It is to be understood that the dimensions of the axial slot 76 and the dimensions of the outlet gap 83 are so chosen that the volume of gas entering and leaving this jet rotating apparatus is approximately the same.

The outlet gap is provided or formed by having a hiatus in the circumferential gasket 82. Thus, gasket 82 extends around the majority of the circumference of the fixed tube 74 and is in sealing relationship with the axial gaskets 78 and preferably extends approximately two-thirds of the distance around the circumference of the fixed tube 74 as is illustrated in FIG. 3.

As the film 25 travels under the slotted roller 70, it frictionally engages and moves the roller with its helical slot 72 past this confined space which contains the highly reactive $SO_3$ gas. The distance between the axial gaskets 78 thus is a factor in determining how long the film is in contact with the $SO_3$ gas. This distance can be varied by locating the grooves 80 (shown in FIG. 3) for these gaskets closer together on the fixed tube 74 or vice versa.

It is an outstanding feature of this aspect of the invention that the film is given a relatively long contact time with the reactive gas ($SO_3$) during its passage across this confined space and at the same time it is subjected to the high kinetic energy of the jet issuing from axial slot 76 when a section of the helical slot 72 is in alinement therewith. This high kinetic energy disrupts any monomolecular layer effect on the film surface and insures deep penetration or diffusion of the $SO_3$ gas into the polymer chains of the polymer film 25.

It is evident from FIG. 2 that the slotted roller 70 freely rotates on the circumferential gaskets 82 for which are provided grooves 84 in each end of the roller 70. Corresponding circumferential grooves (not shown) are provided in the fixed roller 74.

The gasket material used for gaskets 78, 82 is made from a corrosion resistant elastomer. The preferred elastomer is the copolymer of vinylidene fluoride and hexafluoropropylene which has been given the trademark "Viton." Other equivalent elastomers may be used such as the copolymer of vinylidene fluoride and trifluorochloroethylene disclosed in Pats. 2,752,331 and 2,854,699.

Figure 9:
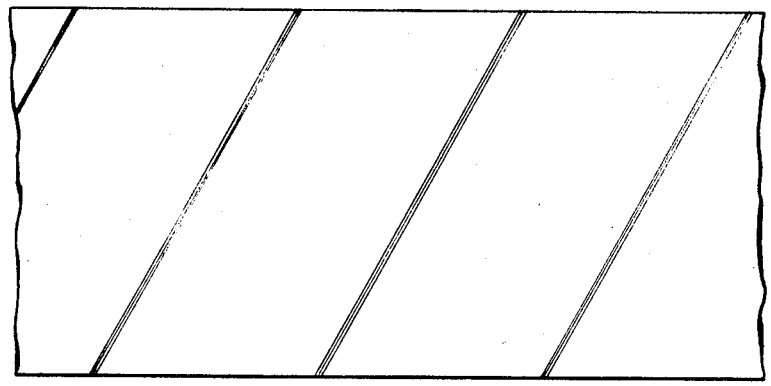
FIG. 9 is a representation of the sulfonated and dyed film after treatment with the internally powered roller of FIGS. 1–3.

As can be seen from FIG. 2, the gas issuing from slot 76 passes through slot 72 as a narrow jet to contact the film. Due to the continuous rotation of the roller 70, this narrow jet effectively moves across the film to produce a diagonal effect as shown in FIG. 9.

It is to be understood that other configurations may be used in place of the single helical slot 72. Thus, instead of a single continuous perforation, one can use two or more continuous perforations such as two helical slots having an opposite "twist." Likewise, a series of discontinuous perforations may be used such as designs to suit the ultimate use of the decorated film. Examples are silhouettes of Christmas trees, hearts, diamonds, fruits, etc.

If desired, the other side of the plastic film can be contacted with second internally powered roller 70 by providing a suitable modification of the sulfonation chamber 10 wherein a second sulfonation zone 46 is provided wherein the underside of the plastic film is treated in essentially the same manner. This concept is not illustrated as it is deemed within the skill of the art.

In FIG. 4, an alternate form of the apparatus is illustrated in which two series of 8 aligned treatment boxes 88 are provided. These series of boxes are mounted on top of each other in spaced relationship in a chamber 86 having sidewalls similar to the chamber 10 of FIG. 1. Each of these boxes is provided with a transverse slot 92 which extends across the width of the film 25. Each box is provided with inlet or outlet lines which are fed to the supply lines 33, 44, and 68 and provided with control valves (not shown).

The film 25 enters this chamber 86 through the inlet slot 21 and exits by means of slot 27. It is dried by a blast of dry inert gas from the slot 92 in the first box provided by line 33. Likewise, excess dry nitrogen is exhausted by a similar slot in the second box through the line 68. This sequence is repeated again in the third and fourth boxes before the film is sulfonated.

After the film is sulfonated by the rollers 102, the excess $SO_3$ is exhausted by the fifth box. The sixth box provides a blast of dry inert gas to remove excess $SO_3$ gas clinging to the film 25. The seventh box removes the excess $SO_3$ discharged by the preceding box and the last box provides another blast of dry inert gas to keep moist air out of the apparatus.

In the middle of the chamber 86, there is provided one or more externally powered perforated rollers 102 which are mounted for rotation and vertical adjustment on floating plates 94 adjustably secured to the side walls of the chamber 86 by bolts 95. These rollers 102 are rotated by means of drive belts 98 and electric motors 100 mounted on, or adjacent to, both the front and back sides of the chamber 86.

Figure 6:
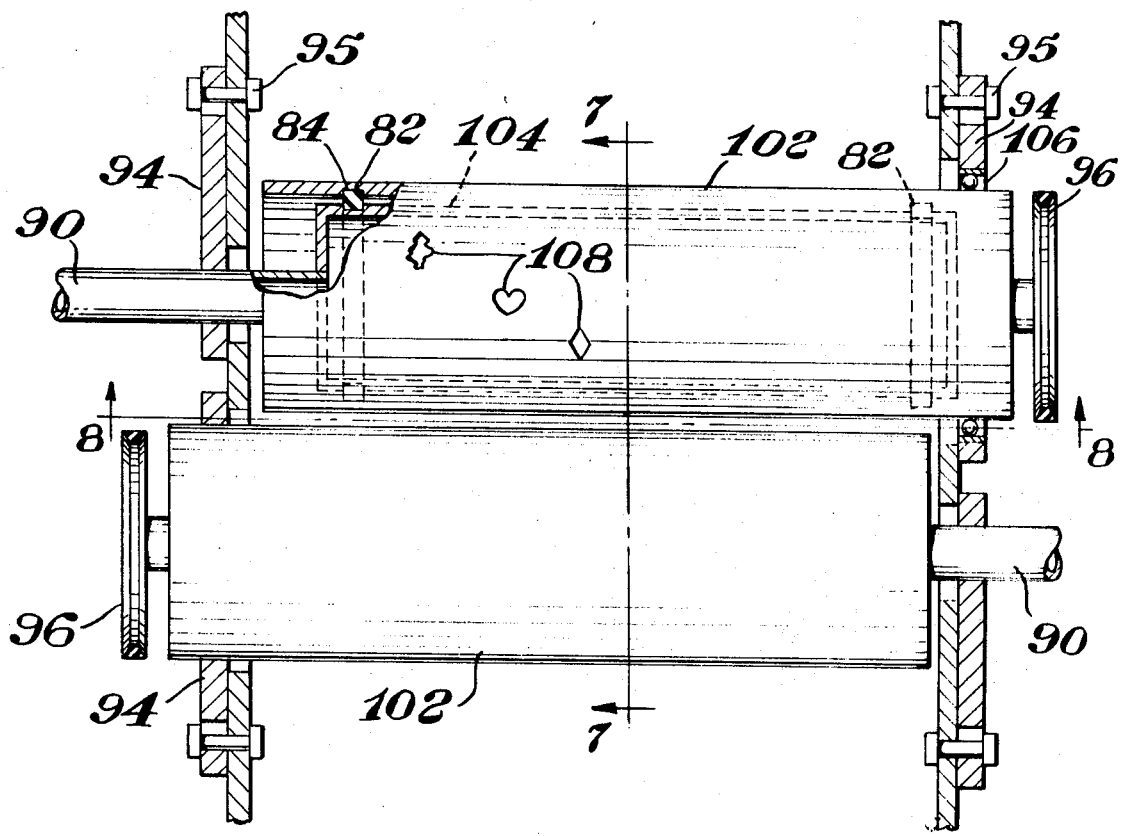
FIG. 6 is a cross-sectional view on line 6—6 of FIG. 5.
Figure 7:
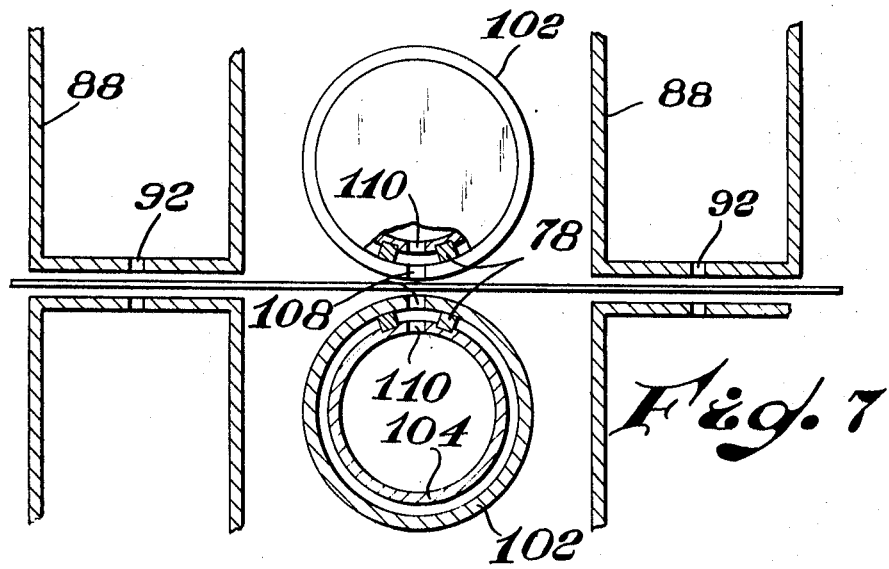
FIG. 7 is a modified cross-sectioned view on line 7—7 of FIG. 6 showing the relationship of the treatment boxes 88 to the film and powered rollers 102.

As illustrated in FIGS. 6 and 7, the film does not contact these rollers but passes closely adjacent to them at a predetermined distance so that when the perforations 108 in the powered rollers 102 is opposite the slot 110 in the fixed tube 104, a jet of gas containing $SO_3$ contacts the film and sulfonates it in accordance with the configuration of perforations 108.

It is to be understood that the gaskets 78 and 82 used in connection with rollers 102 are similar in nature and function to the aforementioned gaskets for the internally powered roller 70.

The externally powered rollers 102 differ from the previously disclosed internally powered roller 70 in that they have a pulley wheel 96 concentrically mounted thereon which extends outside the chamber 86 as shown by FIG. 6. One end of these rollers 102 is mounted in ball bearings 106 which are supported by one of the floating plates 94. The other end of these rollers is rotationally supported by the circumferential gasket 82.

The $SO_3$ gas is supplied to the rollers from the line 44 by means of the flexible tubes 90 and contacts the film in the manner aforesaid.

Figure 8:
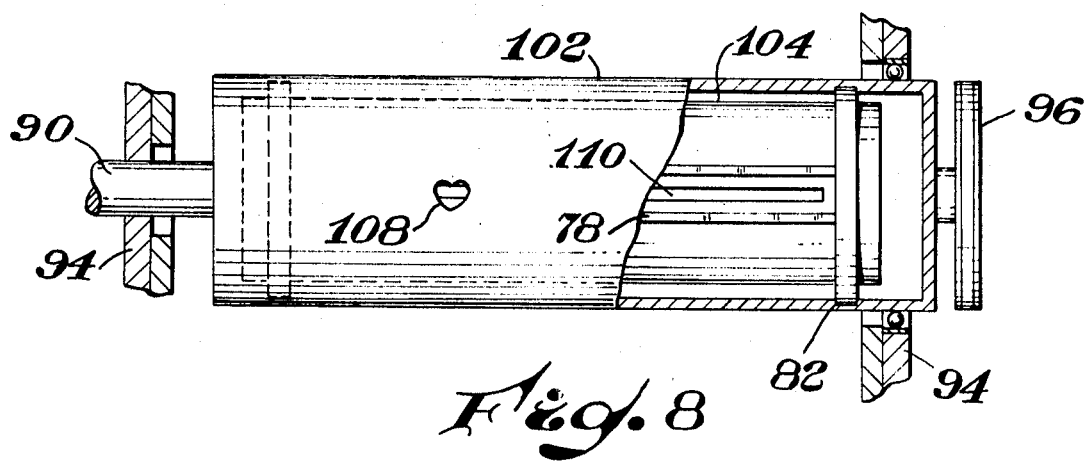
FIG. 8 is a partial cross-sectional view on line 8—8 of FIG. 6.

FIG. 8 is a view on line 8—8 of FIG. 6 illustrating the perforation or designed hole 108 of the powered roller 102 passing under the axial slot 110 in the fixed tube 104. As is illustrated in FIG. 8, the axial slot 110 is provided with a pair of spaced parallel axial gaskets 78. These gaskets combine with the circumferential gaskets 82 on either end of the fixed tube 104 to provide an enclosed space which is only open for the passage of a jet of $SO_3$ gas when the perforation 108 passes under the axial slot 110 as aforesaid.

In the operation of the present invention, the best reproducibility of the desired design on the perforated rollers is obtained by using the apparatus of FIGS. 1–3 since direct contact of the film and the roller is obtained. However, it is sometimes desirable for higher speeds and less streaking of the film from roller contact to use the apparatus set forth in FIGS. 4–8. With the latter apparatus, the latent decorated effect is less distinct and the apparatus can be adjusted to give a greater or lesser gradual fading of the intensity of the design from the center outwardly. This is an important consideration where the desired result so dictates it.

The foregoing adjustment can be accomplished by one or more alterations in the equipment. For example, the rollers 102 can be moved away from or toward the film 25 by moving the floating plates 94, the velocity of the $SO_3$ gas jets through the designed holes 108 can be lowered or increased, the contact time between the film and the jets can be varied by increasing or decreasing the circumferential distances between the axial gaskets 78 on rollers 102, and the speed of the film through the apparatus can be increased or decreased. Other adjustments will occur to those skilled in the art.

The materials of construction for the apparatus of the present invention are not critical. However, stainless steel is preferred since it is resistant to the highly reactive $SO_3$ gas. It is preferred to make the perforated rollers out of stainless steel of a thin gage, e.g. $\frac{1}{16}$ inch or less and preferably $\frac{1}{64}$ of an inch, since this is easily cut to create the desired designs therein and has the required rigidity.

In a typical example, a polystyrene film of 10 inch width and 3 mils thickness is run at 60 feet per minute in contact with a helically slotted roller of 0.015 gage stainless steel and 6 inches outside diameter having a single slot of 0.010 of an inch in width mounted on a similar fixed tube having an axial slot of 0.010 of an inch in width to provide a space between the roller and tube of $\frac{1}{64}$ of an inch. The film is sulfonated with a dry gas jet of 2 percent by volume of $SO_3$ diluted with carbon dioxide having a velocity of 150 feet per second. When the film is subsequently dyed with a solution of methyl violet, a series of diagonal bands of violet is observed on one side of the film as illustrated in FIG. 9.

In contrast, when the velocity of the sulfonation gas is reduced to 40 feet per second under the same conditions, less sulfonation occurs and the film is not sulfonated and dyed violet uniformly in the desired pattern. This is believed to be due to the fact that at this velocity and with the distances as aforesaid, the $SO_3$ gas does not have sufficient energy to disrupt any monomolecular layer on the film and uniformly sulfonate it in accordance with the design characteristics of the roller.

Similar undesirable results are obtained if the distance from the film 25 to the rollers 102 in FIG. 6 is too large for the rate of flow of the $SO_3$ gas.

The desired decorations are obtained only by a careful balancing of the above factors which can easily be determined by trial and error during production runs of the apparatus.

It is to be understood that the drawings, particularly FIGS. 3 and 7, are dimensionally exaggerated for the purposes of clearly illustrating the interrelationship of the parts therein.

For the purposes of this invention the term "jet rotating means" is defined to mean apparatus for producing jets of a reactive gas such as $SO_3$ in which the jet is produced from a stationary aperture around which rotates a cylindrical member having designed perforations so that the only jets that issue from said jet rotating means are the ones that pass through and are shaped by the designed perforations.

I claim:

1. Apparatus for the surface sulfonation of plastic film to achieve a latent decorated effect which comprises
   (a) a substantially dry sulfonation chamber substantially enclosed from the surrounding atmosphere having gas inlet means to maintain said chamber dry, gas exhaust means, jet rotating means, and inlet and outlet means for permitting said plastic film to move therethrough,
   (b) means to supply a moving plastic film to and through said chamber,
   (c) means to generate and supply a gas containing sulfur trioxide to said jet rotating means, said jet rotating means being located in said chamber adjacent to and transversely of said film whereby the jet therefrom sulfonates said film as said film moves past said jet means to produce a latent decorated effect.

2. The apparatus as set forth in claim 1 in which the jet rotating means comprises a freely rotating hollow cylindrical body mounted for frictional engagement with said film on a fixed tube having an axial outlet slot therein, in which said hollow body has at least one perforation therein which permits said gas containing sulfur trioxide to be forced through said axial slot and said perforation to sulfonate said film.

3. The apparatus as set forth in claim 2 in which said hollow body has a plurality of perforations.

4. The apparatus as set forth in claim 2 in which said hollow body has a continuous perforation.

5. The apparatus as set forth in claim 2 in which said hollow body has a plurality of discontinuous perforations.

6. The apparatus as set forth in claim 1 in which the jet rotating means comprises at least one hollow cylindrical body having driving means attached thereto mounted on a fixed tube having an axial outlet slot therein, whereby said hollow body has at least one perforation therein which permits gas containing sulfur trioxide to be forced through said axial slot and said perforations to sulfonate said film.

7. The apparatus as set forth in claim 6 in which the jet rotating means comprises two hollow cylindrical bodies.

8. The apparatus as set forth in claim 6 in which said hollow body has a plurality of perforations.

9. The apparatus as set forth in claim 6 in which said hollow body has a continuous perforation.

10. The apparatus as set forth in claim 6 in which said hollow body has a plurality of discontinuous perforations.

References Cited

UNITED STATES PATENTS

| | | | |
|---|---|---|---|
| 2,258,659 | 10/1941 | Mosler, Jr. | 18—10X |
| 2,400,720 | 5/1946 | Staudinger et al. | 117—118 |
| 2,776,452 | 1/1957 | Chavannes | 18—10 |
| 2,937,066 | 5/1960 | Walles | 264—78X |
| 3,104,937 | 9/1963 | Wychoff et al. | 18—10X |
| 3,262,159 | 7/1966 | Falkenau et al. | 18—10X |

J. SPENCER OVERHOLSER, Primary Examiner

R. L. SPICER, Jr., Assistant Examiner

U.S. Cl. X.R.

8—149.2; 68—5D; 118—48, 67, 63, 406